US006284977B1

(12) United States Patent
Boron et al.

(10) Patent No.: US 6,284,977 B1

(45) Date of Patent: Sep. 4, 2001

(54) SPLICE CONNECTOR AND METHOD OF USING THE SAME

(75) Inventors: Marcus Preston Boron, Tuscon, AZ (US); Harold John Jenkins, West Glenville; Raymond Alan White, Schenectady, both of NY (US); Richard John Keck, Simpsonville, SC (US); Robert Elmer Sundell, Clifton Park, NY (US); Walter Whipple, III, Amsterdam, NY (US); Kamlesh Mundra, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/494,466

(22) Filed: Jan. 31, 2000

(51) Int. Cl.[7] .......................... H02G 3/06

(52) U.S. Cl. .......................... 174/88 R; 439/284

(58) Field of Search .......................... 174/84 C, 88 R, 174/84 R; 439/284, 292, 293, 294, 295, 869, 287

(56) References Cited

U.S. PATENT DOCUMENTS

| | | | | |
|---|---|---|---|---|
| 925,293 | * | 6/1909 | Cheney | 439/292 X |
| 5,403,977 | * | 4/1995 | Steptoe et al. | 174/88 R X |
| 5,502,280 | * | 3/1996 | Rocci et al. | 174/84 R |

* cited by examiner

*Primary Examiner*—Chau N. Nguyen
(74) *Attorney, Agent, or Firm*—Donald S. Ingraham; Douglas E. Stoner

(57) ABSTRACT

A splice connector includes a first coupling electrically connected to a first cable or conductor and a second coupling electrically connected to a second cable or conductor. Both couplings include at least one electrically conductive spade. The second coupling engages the first coupling so that the respective spades contact each other, thereby electrically connecting the two cables or conductors. Due to its construction and mass, this connector can be used in high temperature, high-G environments.

29 Claims, 4 Drawing Sheets

SPLICE CONNECTOR AND METHOD OF USING THE SAME

BACKGROUND OF THE INVENTION

This invention relates generally to electrical splice connectors and more particularly to such connectors that are useful in gas turbine engines.

A gas turbine engine includes a compressor that provides pressurized air to a combustion section where the pressurized air is mixed with fuel and ignited for generating hot combustion gases. These gases flow downstream to a multistage turbine. Each turbine stage includes a plurality of circumferentially spaced apart blades or buckets extending radially outwardly from a wheel that is fastened to a shaft for rotation about the centerline axis of the engine. The hot gases expand against the turbine buckets causing the wheel to rotate. This in turn rotates the shaft that is connected to the compressor and may be also connected to load equipment such as an electric generator or a propeller. Thus, the turbine extracts energy from the hot gases to drive the compressor and provide useful work such as generating electricity or propelling an aircraft in flight.

It is well known that the efficiency of gas turbine engines can be increased by raising the turbine operating temperature. As operating temperatures are increased, the thermal limits of certain engine components, such as the turbine buckets, may be exceeded, resulting in reduced service life or even material failure. In addition, the increased thermal expansion and contraction of these components adversely affects clearances and their interfitting relationship with other components. Thus, it is common to monitor the temperature of turbine buckets during engine operation to assure that they do not exceed their maximum rated temperature for an appreciable period of time.

One approach to monitoring turbine bucket conditions is to place devices, such as thermocouples and strain gauges, directly onto the bucket and then connect the devices to the appropriate monitoring equipment. Typically, the measuring device with a lead cable is first attached to the turbine bucket, and the lead cable is then spliced to another cable that is connected to the monitoring equipment after the bucket has been mounted to the wheel. However, this splice must be completed on the factory floor in a confined space between turbine wheels because the buckets are not mounted onto the wheels until after the wheels are stacked onto the turbine rotor. Because of the confined space, the conventional splicing technique of twisting and tack welding corresponding wires together is very difficult to perform. Accordingly, there exists a need for a splice connector that would facilitate splicing the bucket instrumentation cables.

BRIEF SUMMARY OF THE INVENTION

The above-mentioned need is met by the present invention which provides a splice connector including a first coupling electrically connected to a first cable or conductor and a second coupling electrically connected to a second cable or conductor. Both couplings include at least one spade. The second coupling engages the first coupling so that the respective spades contact each other, thereby electrically connecting the two cables or conductors.

The present invention and its advantages over the prior art will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
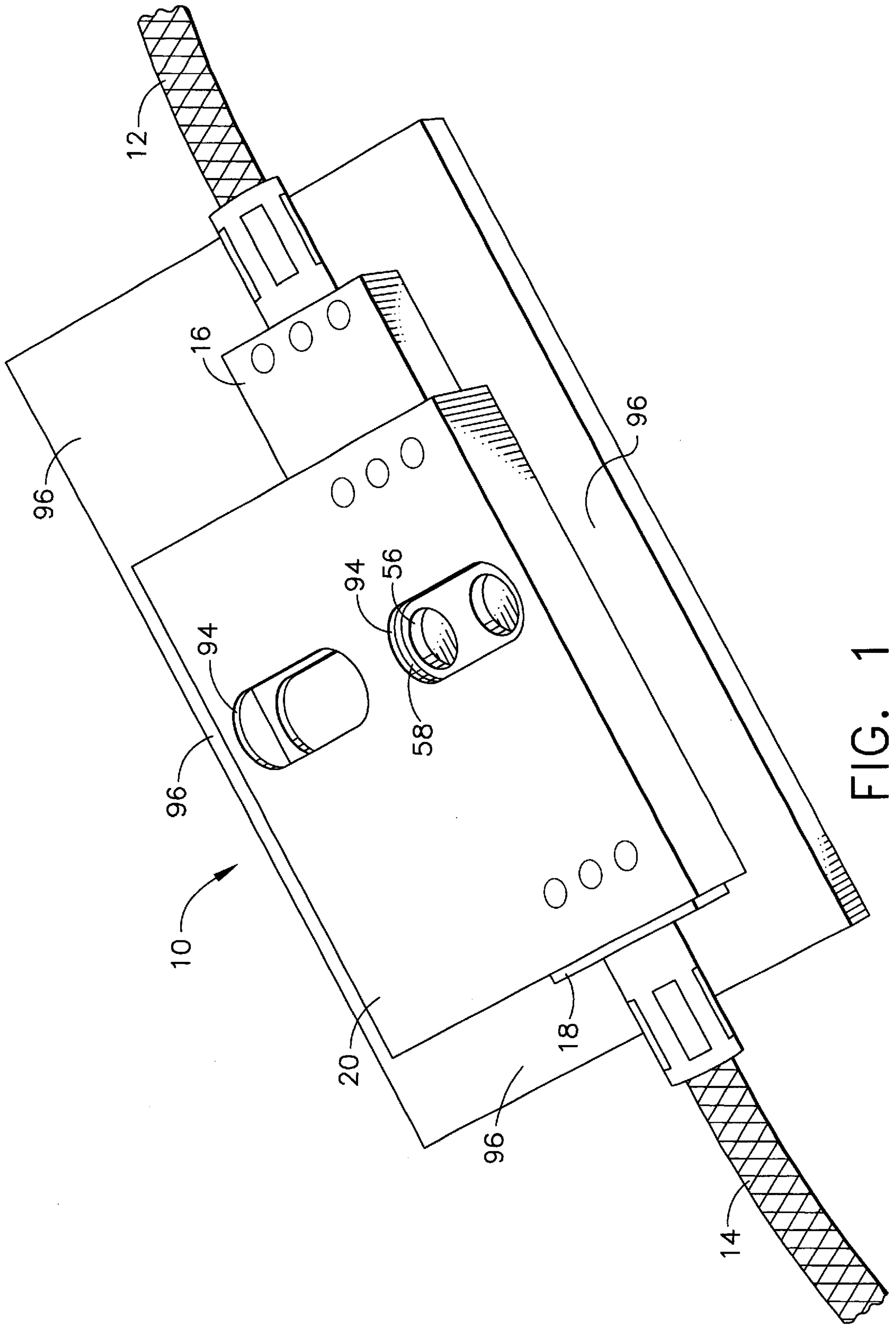
FIG. 1 is a perspective view of the splice connector of the present invention.
Figure 2:
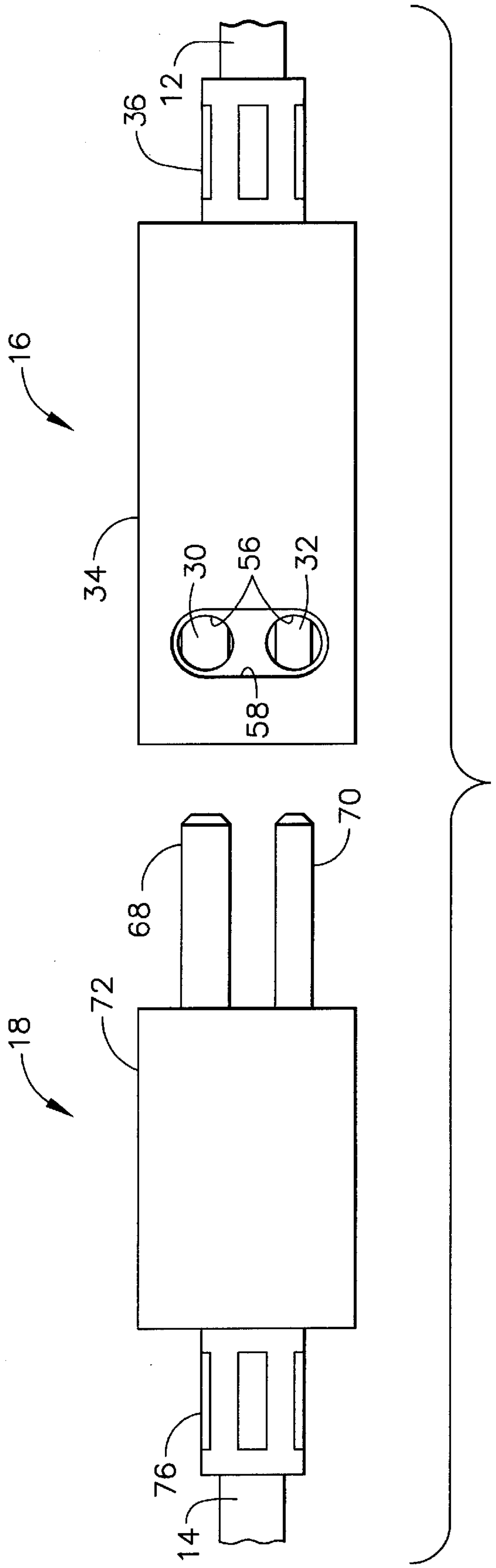
FIG. 2 is a top view of the splice connector of FIG. 1 with the outer case removed and the interfitting couplings pulled apart.
Figure 3:
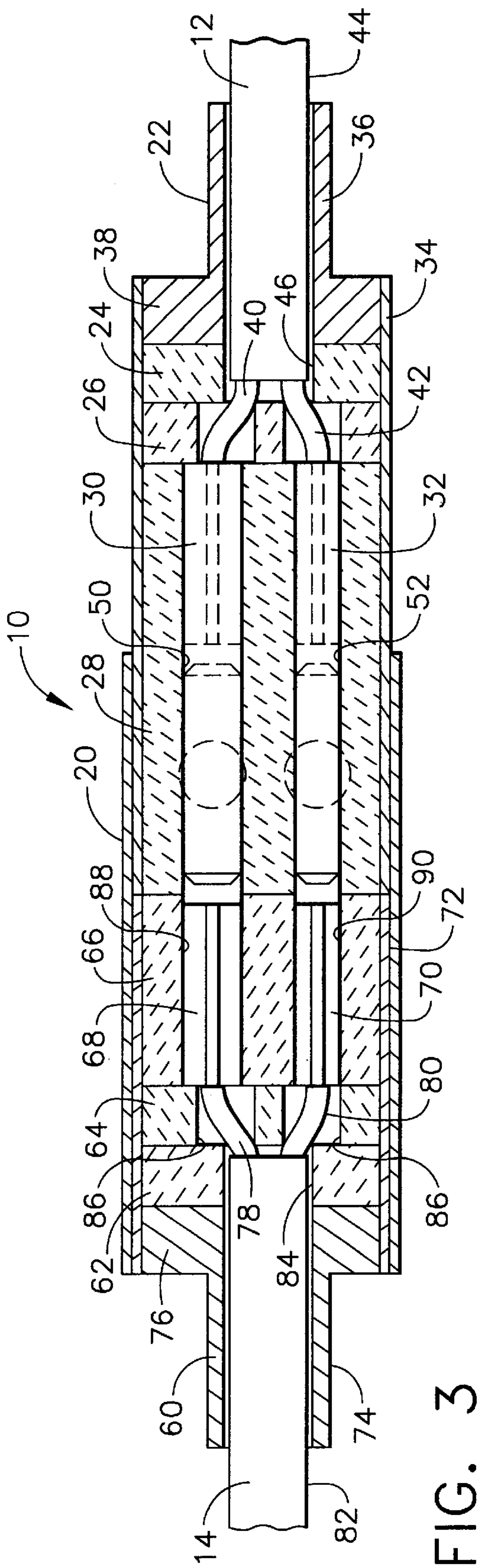
FIG. 3 is a longitudinal cross-sectional top view of the splice connector of FIG. 1.
Figure 4:
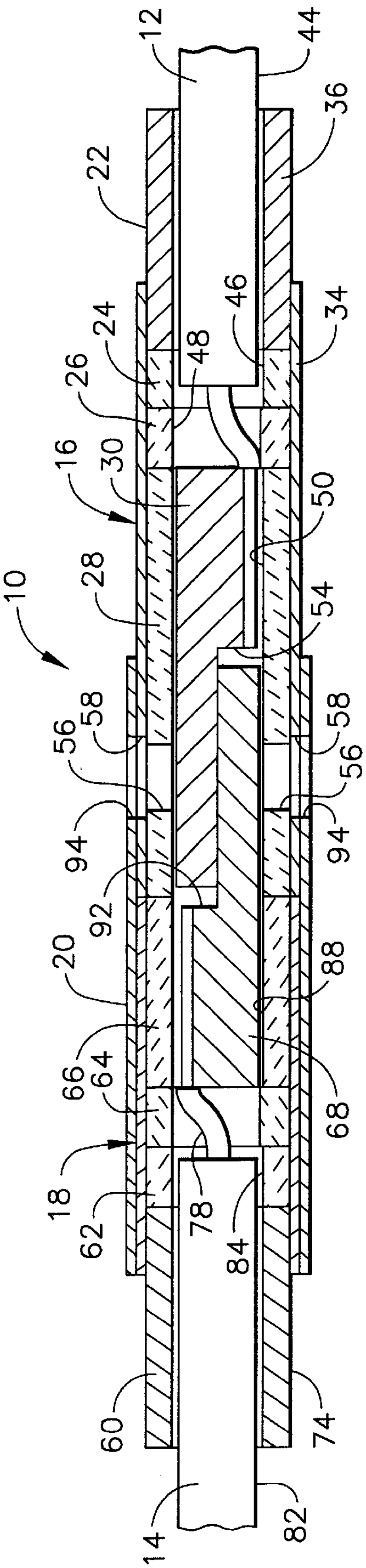
FIG. 4 is a longitudinal cross-sectional side view of the splice connector of FIG. 1.
Figure 5:
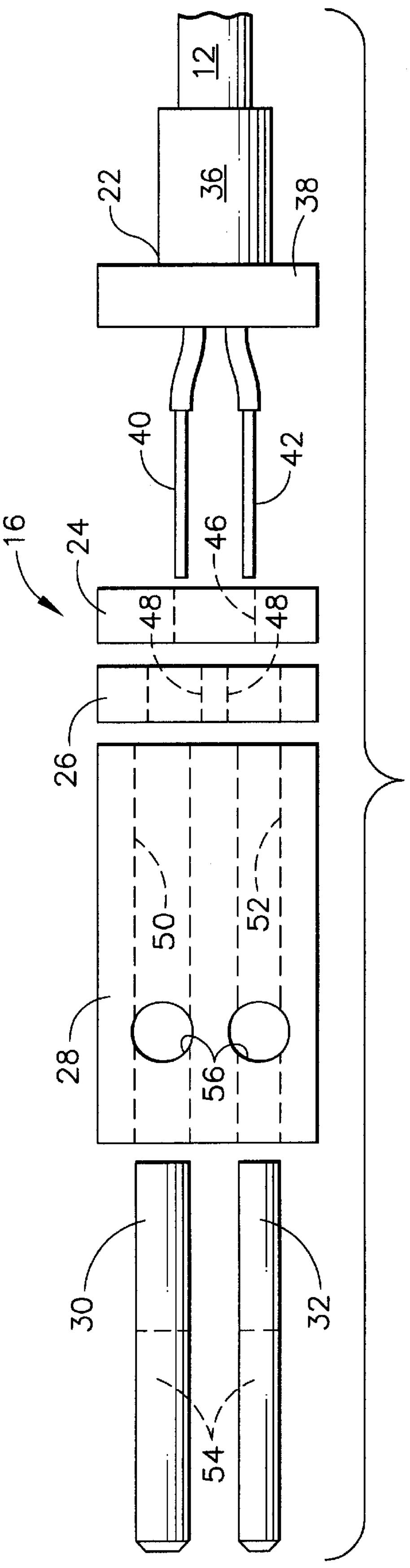
FIG. 5 is an exploded view of the first coupling of the splice connector of FIG. 1.
Figure 6:
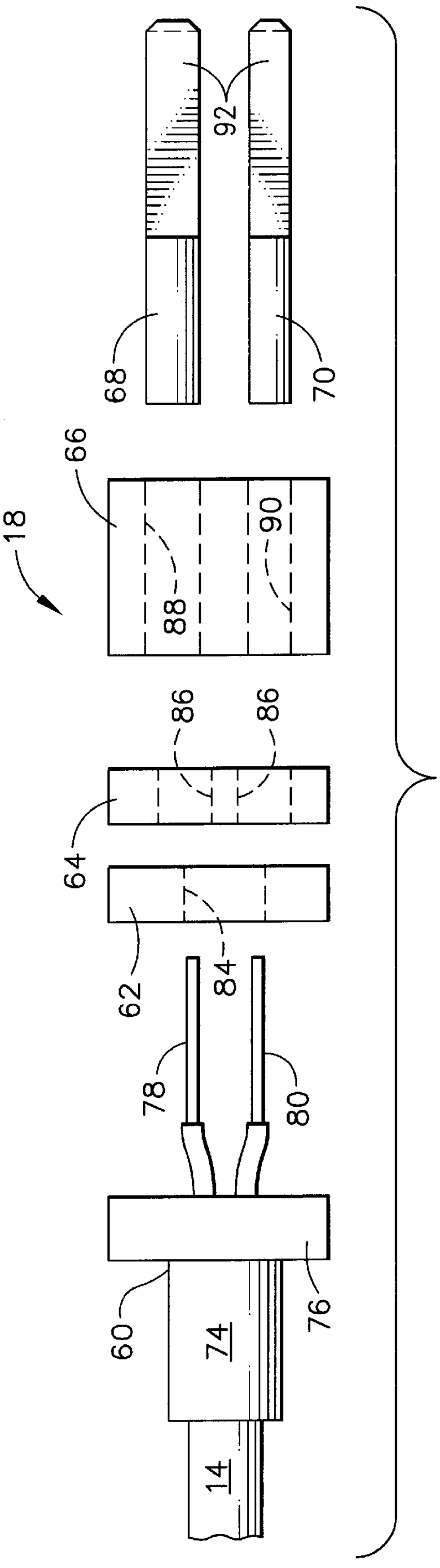
FIG. 6 is an exploded view of the second coupling of the splice connector of FIG. 1.

Referring to the drawings wherein identical reference numerals denote the same elements throughout the various views, FIG. 1 shows a splice connector 10 for splicing a first cable 12 to a second cable 14. The splice connector 10 includes first and second interfitting couplings 16 and 18 enclosed by an outer case 20. The first coupling 16 is joined to an end of the first cable 12, and the second coupling 18 is joined to one end of the second cable 14. In one preferred application, the first cable 12 is attached to either one of a measuring device, such as a thermocouple or strain gauge, that is placed on a turbine bucket or a piece of monitoring equipment for the measuring device. The second cable 14 is attached to the other one of the measuring device or the monitoring equipment. Accordingly, the splice connector 10 will connect the measuring device to the monitoring equipment. However, it should be understood that this is only one possible use, and the splice connector 10 of the present invention could be used for a wide variety of other splicing applications.

Turning to FIGS. 2–5, it is seen that the first coupling 16 includes an end bell 22, first and second spacers 24 and 26, a spade housing 28, first and second connector components or spades 30 and 32, and a coupling case 34. The end bell 22 includes a ferrule 36 that is crimped onto the free end of the first cable 12 and a flange 38 formed on the outer end of the ferrule 36. For purposes of illustration, the first cable 12 includes two insulated wires 40 and 42 encased in a cover 44, such as a stainless steel braided cover. However, it should be noted that the present invention is not limited to this type of cable and is equally applicable to other types of cables, conductors, wires and the like. Preferably, the ferrule 36 is crimped onto the cover 44, near the free end of the first cable 12, such that an exposed end of each wire 40 and 42 extends through the end bell 22.

The first spacer 24 is a relatively thin, rectangular member that is of substantially the same dimensions as the flange 38 and has a single hole 46 formed therein. The first spacer 24 abuts the flange 38 so that the end of the cover 44 is received in the hole 46. The second spacer 26, which is also a relatively thin, rectangular member that is of substantially the same dimensions as the flange 38, abuts the other side of the first spacer 24. The second spacer 26 has two holes 48 formed therein. Each hole 48 receives a respective one of the first and second wires 40 and 42 therein. Both the first and second spacers 24 and 26 are made of an electrically insulating material, preferably a ceramic material such as alumina or glass-ceramics such as that sold under the trademark Macor®. The spacers 24 and 26 thus prevent the exposed ends of the wires 40 and 42 from shorting together or against the coupling case 34.

The spade housing 28 has a first end that abuts the second spacer 26 and has first and second internal cavities 50 and 52 formed therein. The cavities 50 and 52 extend end-to-end, lengthwise, through the spade housing 28 and are thus open at the first and second ends thereof. The first spade 30 is disposed in the first cavity 50, and the second spade 32 is disposed in the second cavity 52. Both spades 30 and 32 have a length that is substantially equal to the length of the spade housing 28 so as to be contained within their respective cavity 50, 52. As seen in the Figures, the first spade 30 is wider than the second spade 32, and the widths of the cavities 50 and 52 match the widths of the respective spades 30 and 32 so that the first cavity 50 is wider than the second cavity 52. As will be explained in more detail below, this assures that the engagement of the first and second couplings 12 and 14 can only occur with the correct orientation. The spade housing 28 is also made of an electrically insulating material, preferably a ceramic material such as alumina or glass-ceramics such as that sold under the trademark Macor®, so as to prevent the wires 40 and 42 or the spades 30 and 32 from shorting together or against the coupling case 34.

The exposed end of the first wire 40 is joined (such as by welding) to one end of the first spade 30 inside the first cavity 50. Similarly, the exposed end of the second wire 42 is joined to one end of the second spade 32 inside the second cavity 52. The spades 30 and 32 are made of an electrically conductive material, preferably, but not necessarily, the same material as the corresponding wire 40 and 42. The other end of each spade 30 and 32 has a notch 54 formed therein so as to provide clearance between the notched portion of each spade 30 and 32 and the respective cavity 50 and 52. The spades 30 and 32 are situated within the cavities 50 and 52, respectively, so that their notched portions are adjacent the second end of the spade housing 28.

Two access holes 56 are formed in the upper surface of the spade housing 28, such that one access hole 56 is in communication with the first cavity 50 and the other access hole 56 is in communication with the second cavity 52. Two additional access holes 56 are formed in the bottom surface of the spade housing 28, one in communication with the first cavity 50 and the other in communication with the second cavity 52. All of the access holes 56 are located nearer to the second end of the spade housing 28, at the same distance from the edge, so as to be aligned with the notched portions of the corresponding spade 30, 32.

The end bell flange 38, the first spacer 24, the second spacer 26 and the spade housing 28 are all enclosed by the coupling case 34. The coupling case 34 is made of any suitable material, such as stainless steel or a Nichrome® alloy, and is preferably tack welded at a first end to the end bell flange 38. The second end of the coupling case 34 is open so as to provide access to the first and second cavity openings in the second end of the spade housing 28. A large access hole 58 is formed in both the upper and bottom surfaces of the coupling case 34. The case access holes 58 are positioned so as to be aligned with the access holes 56 of the spade housing 28 and are large enough to provide access to both access holes 56 formed in the corresponding upper and bottom surface of the spade housing 28.

Referring now to FIGS. 2–4 and 6, the second coupling 18 is described in more detail. The second coupling 18 is similar to the first coupling 16 in that it contains substantially the same assembly of elements. However, as will now be described, the second coupling 18 is configured somewhat differently. Specifically, the second coupling 18 includes an end bell 60, first and second spacers 62 and 64, a spade housing 66, first and second connector components or spades 68 and 70, and a coupling case 72. The end bell 60 includes a ferrule 74 that is crimped onto the free end of the second cable 14 and a flange 76 formed on the outer end of the ferrule 74. Like the first cable 12, the second cable 14 includes two insulated wires 78 and 80 encased in a cover 82, such as a stainless steel braided cover, although other types of cables, conductors, wires or the like could be used. Preferably, the ferrule 74 is crimped onto the cover 82, near the free end of the second cable 14, such that an exposed end of each wire 78 and 80 extends through the end bell 60.

The first spacer 62 is a relatively thin, rectangular member that is of substantially the same dimensions as the flange 76 (as well as the flange 38 of the first coupling 18) and has a single hole 84 formed therein. The first spacer 62 abuts the flange 76 so that the end of the cover 82 is received in the hole 84. The second spacer 64, which is also a relatively thin, rectangular member that is of substantially the same dimensions as the flange 76, abuts the other side of the first spacer 62. The second spacer 64 has two holes 86 formed therein. Each hole 86 receives a respective one of the first and second wires 78 and 80 therein. Both the first and second spacers 62 and 64 are made of an electrically insulating material, preferably a ceramic material such as alumina or glass-ceramics such as that sold under the trademark Macor®. The spacers 62 and 64 thus prevent the exposed ends of the wires 78 and 80 from shorting together or against the coupling case 72.

The spade housing 66 has a first end that abuts the second spacer 64 and has first and second internal cavities 88 and 90 formed therein. The cavities 88 and 90 extend end-to-end, lengthwise, through the spade housing 66 and are thus open at the first and second ends thereof. The first spade 68 is partially disposed in the first cavity 88, and the second spade 70 is partially disposed in the second cavity 90. The spade housing 66 is also made of an electrically insulating material, preferably a ceramic material such as alumina or glass-ceramics such as that sold under the trademark Macor®, so as to prevent the wires 78 and 80 or the spades 68 and 70 from shorting together or against the coupling case 72.

The length of the spade housing 66 is significantly shorter than the length of the spades 68 and 70 so that a portion of each spade 68 and 70 extends outwardly from the second end of the spade housing 66. The portion of each spade 68 and 70 that extends out of the spade housing 66 has a notch 92. The extending portions of the spades 68 and 70 are thus sized to be received within the clearances of the respective first coupling cavities 50 and 52. These portions of the spades 68 and 70 thereby overlap the notched portions of the first coupling spades 30 and 32, respectively, when the first and second couplings 16 and 18 are joined together. The exposed end of the first wire 78 is joined (such as by welding) to the portion of the first spade 68 that is disposed within the first cavity 88. Similarly, the exposed end of the second wire 80 is joined to the portion of the second spade 70 that is disposed within the second cavity 90.

The first and second spades 68 and 70 have the same disparity in width as the first and second spades 30 and 32 of the first coupling 16. That is, the first spade 68 is the same large width as the first spade 30, and the second spade 70 has the same small width as the second spade 32. Because the widths of the cavities 50 and 52 of the first spade housing 28 match the widths of the corresponding spades, the wider first spade 68 can only be received in the wider first cavity 50. That is, the first spade 68 is too wide to be received in the narrower second cavity 52. This arrangement assures that the engagement of the first and second couplings 12 and 14 can only occur with the correct orientation or electrical polarity. While the first spades 30 and 68 have been described as being wider than the second spades 32 and 70, this could be reversed. As long as one set of spades is wider than the other, proper orientation will be assured.

Thus, the first and second couplings 16 and 18 are engaged by inserting the first spade 68 of the second coupling 18 into the first cavity 50 and the second spade 70 of the second coupling 18 into the second cavity 52. When the first and second couplings 16 and 18 are properly engaged, the first spade 68 contacts the first spade 30 of the first coupling 16, and the second spade 70 contacts the second spade 32 of the first coupling 16. Accordingly, the first and second cables 12 and 14 are electrically connected with the proper polarity. If the polarity is not a concern, then the spades could all be the same size. Although the overlapping portions of the spades 30 and 68 are shown in Figure as being in contact with one another, it should be noted that these spades 30 and 68 (and spades 32 and 70 as well) could be made with slight clearances between them. This arrangement will make it easier for the spades 68 and 70 to be received in the cavities 50 and 52. Electrical connection of the respective spade pairs would then be made by welding them, as will be described in more detail below. In addition, all of the spades 30, 32, 68 and 70 can be provided with chamfered ends to further facilitate the connection.

Like the spades 30 and 32 of the first coupling 16, the spades 68 and 70 are made of an electrically conductive material, preferably, but not necessarily, the same material as the corresponding wire 78 and 80. When used in one preferred application of a thermocouple installed on a turbine bucket, the wires 40, 42, 78 and 80 are made of dissimilar materials capable of conducting signals at high temperatures (650 C.). For example, the wires 40, 42, 78 and 80 could be made of type "K" thermocouple wire with the first wires 40 and 78 having one polarity and the second wires 42 and 80 having the other polarity. In this case, the first spades 30 and 68 would preferably be made of the same material as the first wires 40 and 78, and the second spades 32 and 70 would preferably be made of the same material as the second wires 42 and 80.

The end bell flange 76, the first spacer 62, the second spacer 64 and the spade housing 66 are all enclosed by the coupling case 72. The coupling case 72 is made of any suitable material, such as stainless steel or a Nichrome® alloy, and is preferably tack welded at a first end to the end bell flange 76.

As seen in FIG. 1, the first and second couplings 16 and 18 are both retained within the outer case 20. The outer case 20 is open at both ends so that the first coupling 16 is received in the first end and the second coupling 18 is received in the second end. The outer case 20 is tack welded to both the first and second couplings 16 and 18. At least one access hole 94 is formed in each of the upper and bottom surfaces of the outer case 20. The outer case access holes 94 are positioned so as to be aligned with the access holes 58 in the first coupling case 34 and the access holes 56 of the spade housing 28. The outer case access holes 94 are large enough to provide access to both access holes 56 formed in the corresponding upper and bottom surface of the spade housing 28. The outer case 20 can be configured as a "one-pack" case (i.e., adapted to receive a single pair of couplings 16 and 18) or a "multi-pack" case adapted to receive multiple pairs of couplings. FIG. 1 shows a two-pack case that could accommodate a second coupling pair not shown in the Figure. Mounting flanges 96 are preferably formed on all four sides of the outer case 20 and provide a means for attaching the splice connector 10 to an appropriate structure such as a turbine wheel. The outer case 20 may be made of any suitable material such as stainless steel or a nickel alloy such as Inconel 600.

The splice connector 10 thus provides a way to easily and reliably splice two cables together. By way of example, the splice connector 10 could be used in the following procedure to splice a cable (for sake of example, the first cable 12) connected to a measuring device, such as a thermocouple or strain gauge, that is placed on a turbine bucket to another cable (for sake of example, the second cable 14) connected to a piece of monitoring equipment for the measuring device. The first step would be to connect the first coupling 16 to the free end of the first cable 12 and the second coupling 18 to the free end of the second cable 14, although it does not matter which coupling is connected to which cable.

The connection of the first coupling 16 to the first cable 12 is made by first stripping the insulation back from the wires 40 and 42 and then threading the end bell 22 over the braided cover of the cable 12. The first and second spacers 24 and 26 are then threaded over the wires 40 and 42, with each wire 40 and 42 passing through a separate one of the holes 48 formed in the second spacer 26. The ends of the wires 40 and 42 are then flattened and welded to the large ends of the first and second spades 30 and 32, respectively. Resistance welds are preferred for attaching the wires 40 and 42 to the spades 30 and 32. However, cold welds such as crimping could also be employed. The spades 30 and 32 are then inserted into the corresponding cavities 50 and 52 of the spade housing 28 so that the notched end of each spade 30 and 32 is exposed to the access holes 56. At this point, the ferrule 36 of the end bell 22 is crimped onto the braided cover of the cable 12. This acts as a strain relief between the wires 40 and 42 and the spades 30 and 32. Next, the coupling case 34 is disposed over the end bell flange 38, first and second spacers 24 and 26 and the spade housing 28 such that the access holes 58 of the coupling case 34 are aligned with the housing access holes 56. The coupling case 34 is then tack welded to the flange 38. This completes the assembly and connection of the first coupling 16 to the first cable 12. The second coupling 18 is assembled and connected to the second cable 14 by the substantially identical series of steps.

Once the measuring devices are attached to the turbine buckets and the turbine buckets are mounted onto the turbine wheels, a splice is made on the turbine by inserting the first coupling 16 into one open end of the outer case 20. After centering the access holes 56 and 58 of the first coupling 16 in the corresponding access holes 94 of the outer case 20, the outer case 20 is tack welded to the first coupling case 34. The second coupling 18 is then inserted into the other open end of the outer case 20 so that it engages the first coupling 16. That is, the first spade 68 of the second coupling 18 is received in the first cavity 50 of the first coupling 16 and the second spade 70 is received in the second cavity 52. A visual check is made through the aligned access holes to assure that the spades 30 and 32 of the first coupling 16 are aligned with the respective spades 68 and 70 of the second coupling 18. The second coupling case 72 is preferably flush against the first coupling case 34. The outer case 20 is then tack welded to the second coupling case 72. The splice is then completed by tack welding the overlapping first spades 30 and 68 and the overlapping second spades 32 and 70 together. This can be accomplished with a resistance tweezer welder wherein the aligned sets of access holes provide access for the electrodes of the welder.

Lastly, the splice connector 10 is attached to a turbine wheel by tack welding the mounting flanges 96 to the wheel. A thin covering (not shown) of a material such as a Nichrome® alloy is welded to the wheel so as to cover the splice connector 10 and hold it in place during turbine operation.

The foregoing has described a splice connector that facilitates splicing cables or other conductors in confined spaces. Because of its construction and mass, this connector can be used in high temperature, high-G environments. While specific embodiments of the present invention have been described, it will be apparent to those skilled in the art that various modifications thereto can be made without departing from the spirit and scope of the invention as defined in the appended claims.

What is claimed is:

1. A splice connector for splicing together two conductors, said splice connector comprising:

a first coupling having a first conductor of said two conductors electrically connected to a first spade on a first end of said first spade and having a first housing having a first cavity; and a second coupling having a second conductor of said two conductors electrically connected to a second spade on a first end of said second spade;

said first cavity in said first housing being adapted to receive said second spade such that said first and second spades are disposed therein in electrical contact with one another;

said first housing further having at least one access hole disposed to allow bonding together of said first and second spades.

2. The splice connector of claim 1 wherein said first and second spades are welded together.

3. The splice connector of claim 1, wherein said first spade is disposed in said first cavity such that a second end of said first spade does not extend beyond an edge of said first housing facing said second coupling;

said second coupling having a second housing having a second cavity formed therein, said second spade being partially disposed in said second cavity so that a portion of a second end of said second spade extends outwardly from an edge of said second housing facing said first housing; and said first and second cavities are aligned to dispose said second spade into said first cavity.

4. The splice connector of claim 3 wherein said portion of said second spade that extends outwardly from one end of said second housing is disposed in said first cavity so as to overlap said first spade.

5. The splice connector of claim 4 wherein said first spade has a notch formed therein so as to provide clearance in said first cavity for said portion of said second spade that extends outwardly from said one end of said second housing.

6. The splice connector of claim 3 wherein said first and second housings are both made of an electrically insulating material.

7. The splice connector of claim 3 wherein said first coupling includes a first coupling case enclosing said first housing, and said second coupling includes a second coupling case enclosing said second housing.

8. The splice connector of claim 7 wherein said first coupling case has at least one access hole formed therein, said access hole of said first coupling case being aligned with said access hole of said first housing.

9. The splice connector of claim 8 further comprising an outer case enclosing said first and second coupling cases, said outer case having at least one access hole formed therein that is aligned with said access hole of said first coupling case.

10. The splice connector of claim 10 wherein said outer case has at least one mounting flange formed thereon.

11. A splice connector for splicing a first cable to a second cable, said splice connector comprising:

a first coupling having a first spade electrically connected at a first end of said first spade to a first wire in said first cable and a second spade electrically connected at a first end of said second spade to a second wire in said first cable, and a first housing adapted to have a first cavity and a second cavity in parallel along the longitudinal direction;

a second coupling having a third spade electrically connected at a first end of said third spade to a first wire in said second cable and a fourth spade electrically connected at a first end of said fourth spade to a second wire in said second cable;

said first and third spades being disposed in said first cavity in electrical contact with one another;

said second and fourth spades being disposed in said second cavity in electrical contact with one another;

said first housing having at least one first cavity access hole disposed to allow bonding of said first and third spades, with said first access hole in communication with said first cavity at a point of electrical contact with said first and third spades;

said first housing having at least one second cavity access hole disposed to allow bonding of said second and fourth spades, with said second access hole in communication with said second cavity at a point of said electrical contact with said second and fourth spades; and said second coupling engaging said first coupling so that said third spade contacts said first spade and said fourth spade contacts said second spade.

12. The splice connector of claim 11 wherein said first and third spades are welded together and said second and fourth spades are welded together.

13. The splice connector of claim 11 wherein said second coupling includes a second housing having a third cavity and a fourth cavity formed therein;

said first cavity of said first housing and said third cavity of said second housing are aligned to dispose said third spade into said first cavity;

said second cavity of said first housing and said fourth cavity of said second housing are aligned to dispose said fourth spade into said second cavity;

said third spade being partially disposed in a said third cavity so that a portion of a second end of said third spade extends outwardly beyond an edge of said second housing facing said first housing; and said fourth spade being partially disposed in said fourth cavity so that a portion of a second end of said fourth spade extends outwardly beyond said edge of said second housing facing said first housing.

14. The splice connector of claim 13 wherein said portion of said third spade that extends outwardly beyond said edge of said second housing is disposed in said first cavity so as to overlap said first spade and said portion of said fourth spade that extends outwardly beyond said edge of said second housing is disposed in said second cavity so as to overlap said second spade.

15. The splice connector of claim 14 wherein said first and third spades are formed having a common first width, and said second and fourth spades are formed having a common second width, such that said first and third cavities are formed having said common first width of said first and third spades and said second and fourth cavities are formed having said common second width of said second and fourth spades, respectively, said first width being larger than said second width.

16. The splice connector of claim 14 wherein said first spade has a notch formed therein so as to provide clearance in said first cavity for said portion of said third spade that extends outwardly beyond said edge from said second housing and said second spade has a notch formed therein so as to provide clearance in said second cavity for said portion of said fourth spade that extends outwardly beyond side edge of said second housing.

17. The splice connector of claim 13 wherein said first and second housings are both made of an electrically insulating material.

18. The splice connector of claim 13 wherein said first coupling includes a first end bell attached to said first cable and said second coupling includes a second end bell attached to said second cable.

19. The splice connector of claim 18 further comprising at least one electrically insulating spacer disposed between said first end bell and said first housing and at least another electrically insulating spacer disposed between said second end bell and said second housing.

20. The splice connector of claim 13 wherein said first coupling includes a first coupling case enclosing said first housing, and said second coupling includes a second coupling case enclosing said second housing.

21. The splice connector of claim 20 wherein said first coupling case has at least two access holes formed therein, said access holes of said first coupling case being aligned with both of said access holes of said first housing.

22. The splice connector of claim 21 further comprising an outer case enclosing said first and second coupling cases, said outer case having at least two access holes formed therein that are aligned with said access holes of said first coupling case.

23. The splice connector of claim 22 wherein said outer case has at least one mounting flange formed thereon.

24. A method of splicing together two conductors comprising the steps of:

providing a first coupling having a first spade electrically connected to a first conductor of said two conductors on a first end of said first spade, and a first housing with a first cavity;

providing a second coupling having a second spade electrically connected to a second conductor of said two conductors on a first end of said second spade;

wherein said first cavity being adapted to receive said first and second spades such that said first and second spades are disposed in electrical contact therein, said first housing having at least one access hole disposed to allow bonding of said first and second spades, said access hole being located in communication with both said first cavity and an electrical connection of said first and second spades;

inserting a second end of said first spade into said first cavity such that said second end of said first spade faces an open end of said first cavity in said first housing;

engaging said first and second couplings so that a second end of said second spade is disposed in said first cavity in electrical contact with said second end of said first spade; and bonding said first and second spades through said access hole in said first housing.

25. The method of claim 24 wherein said second coupling comprises a second housing with a second cavity disposed to align with said first cavity of said first housing, said second spade being inserted into said second cavity where said second end of said second spade faces an open end of said second housing, the method further comprising the following steps after completing the step of engaging said first and second couplings and before bonding said first and second spades;

enclosing said first coupling in a first coupling case to longitudinally enclose said first housing where said first coupling case contains at least one access hole that communicates with said access hole in said first housing and said first cavity; and enclosing said second coupling in a second coupling case to longitudinally enclose said second housing.

26. The method of claim 25 further comprising the step of enclosing said first and said second coupling cases with an outer case that has at least one access hole that is in communication with said accesss hole in said first coupling case, said first housing and said first cavity as the last step prior to bonding said first and second spades.

27. A method of splicing together a first cable to a second cable comprising the steps of:

providing a first coupling having a first spade electrically connected at a first end of said first spade to a first wire in said first cable; a second spade electrically connected at a first end of said second spade to a second wire in said first cable; and a first housing having a first cavity and a second cavity in parallel along the longitudinal direction;

providing a second coupling having a third spade electrically connected at a first end of said third spade to a first wire in said second cable, and a fourth spade electrically connected at a first end of said fourth spade to a second wire in said second cable;

wherein said first cavity is adapted to have said first and third spades disposed in electrical contact therein, with said first housing having at least one first cavity access hole disposed to allow bonding of said first and third spades, said access hole being located in communication with both said first cavity and an electrical connection of said first and third spades;

wherein said second cavity is adapted to have said second and fourth spades disposed in electrical contact therein, said first housing further having at least one second cavity access hole disposed to allow bonding of said second and fourth spades, said access hole being in communication with both said second cavity and an electrical connection of said second and fourth spades;

inserting a second end of said first spade into said first cavity such that said second end of said first spade faces an open end of said first cavity in said first housing;

inserting a second end of said second spade into said second cavity such that said second end of said second spade faces an open end of said second cavity in said first housing;

engaging said first and second couplings, such that a second end of said third spade is disposed in said first cavity in electrical contact with said second end of said first spade and such that a second end of said fourth spade is disposed in said second cavity in electrical contact with said second end of said second spade;

bonding said first and third spades through said first cavity access hole in said first housing; and bonding said second and fourth spades at said electrical contact point of said second and fourth spades through said second cavity access hole in said first housing.

28. The method of claim 27 wherein a second housing further comprises a third cavity and fourth cavity formed therein, and wherein said first cavity of said first housing and said third cavity of said second housing are aligned to dispose said third spade into said first cavity and said second cavity of said first housing and said fourth cavity of said second housing are aligned to dispose said fourth spades into said second cavity, the method further comprising the following steps after completing the step of engaging said first and second couplings and before bonding said first and third spades;

disposing said third spade in said third cavity so that a portion of said second end of said third spade extends outwardly beyond an edge of said second housing facing said first housing;

disposing said fourth spade in said fourth cavity so that a portion of said second end of said fourth spade extends outwardly beyond said edge of said second housing facing said first housing;

enclosing said first coupling in a first coupling case to longitudinally enclose said first housing, where said first coupling case contains at least two access holes aligned with said first and second cavity access holes in said first housing and said first and second cavities; and enclosing said second coupling in a second coupling case to longitudinally enclose said second housing.

29. The method of claim 28 further comprising the step of enclosing said first and said second coupling cases with an outer case that has at least two access holes aligned with said first and second cavity access holes in said first coupling case, said first housing and said first and second cavities as the last step prior to bonding said first and third spades.

* * * * *

UNITED STATES PATENT AND TRADEMARK OFFICE
CERTIFICATE OF CORRECTION

PATENT NO. : 6,284,977 B1
DATED : September 4, 2001
INVENTOR(S) : Marcus P. Borom, Harold J. Jenkins, Jr., Raymond A. White, Richard J. Keck, Robert E. Sundell, Walter Whipple III and Kamlesh Mundra It is certified that error appears in the above-identified patent and that said Letters Patent is hereby corrected as shown below:

Title page,
Inventors, the first inventor's name should read -- Marcus Preston Borom --

Signed and Sealed this

Thirtieth Day of April, 2002

*Attest:*

JAMES E. ROGAN
*Director of the United States Patent and Trademark Office*

*Attesting Officer*